Aug. 15, 1950     A. A. BERNARD     2,519,016
HAMMER

Filed April 3, 1947     2 Sheets-Sheet 1

Inventor
Arthur A. Bernard
By: Mann and Brown
Attys.

Aug. 15, 1950      A. A. BERNARD      2,519,016
HAMMER
Filed April 3, 1947      2 Sheets-Sheet 2
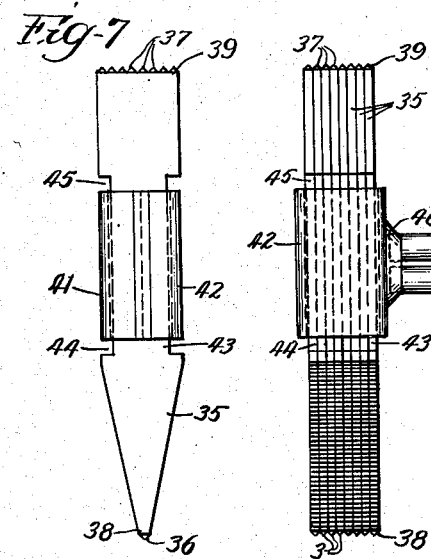
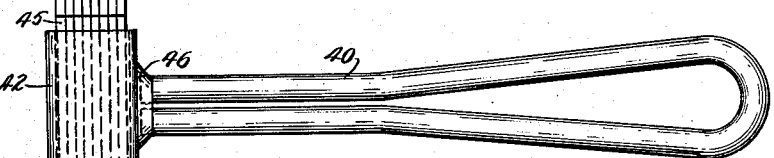
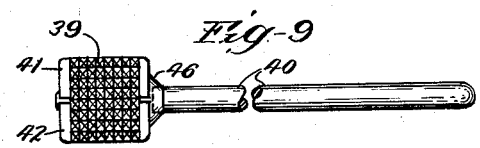
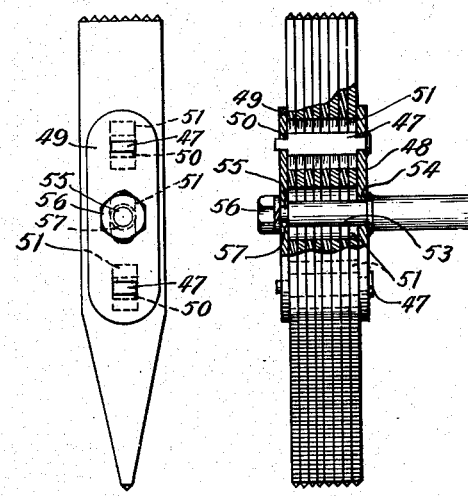
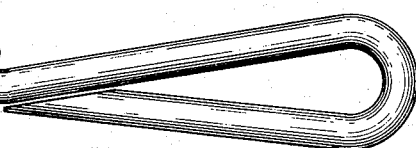
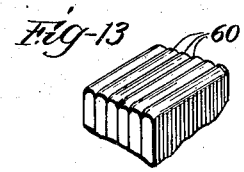
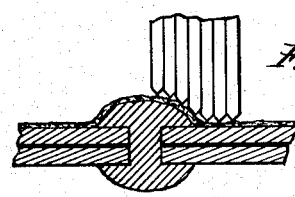
Inventor
Arthur A. Bernard
By:- Mann and Brown
Attys.

Patented Aug. 15, 1950

2,519,016

UNITED STATES PATENT OFFICE 2,519,016

HAMMER

Arthur A. Bernard, Chicago, Ill.

Application April 3, 1947, Serial No. 739,236

8 Claims. (Cl. 29—81)

This invention relates to hammers such as are used in removing slag from welds and in preparing metal surfaces for welding. The hammer of this invention, however, has other uses as will presently appear.

One of the must fundamental requirements for good welding practice is that the metal parts to be welded must be clean and particularly free from rust and other oxide coatings.

By far the greatest tonnage of steel which is fabricated by welding is that commonly referred to as "hot rolled" steel and is in the form of sheets, plates, angles, channels, bars, etc. Due to oxidation at the time of hot rolling, this brand of steel develops a film or skin of oxide on its surface. In some cases the film of oxide is of microscopic thickness and is in such minute quantities it does not seriously interfere with welding, or, if absorbed by the weld metal, does not contaminate the weld or effect its physical property to any serious extent. However, in some cases the oxide coating may be as much as $\frac{1}{32}$ of an inch or even $\frac{1}{16}$ of an inch in thickness, and in such cases the quality of the weld is seriously impaired if the oxide coating is not removed at the weld seam.

Oftentimes also, metal to be fabricated is stored in the open and accumulates much rust which must be removed before a weld is made.

In welding heavy plates or other metal parts, it is usually necessary to make several welding passes over the seam to build up the weld to the desired depth, and the flux material that is ordinarily used in the welding operation creates a slag formation over the weld which must be removed prior to making a subsequent welding pass over the same seam.

Similarly after a weld has been completed, the slag should be removed prior to painting or other finishing operations.

In all such cases, it has been customary to use what is known in the trade as chipping hammers or cleaning hammers, which ordinarily are provided with a pick point at one end and a chisel point at the other end so that by striking rapid blows on the area to be cleaned, the oxide coating of slag is removed bit by bit.

A welder may spend as much time in properly cleaning the parts to be welded as he does in actually performing the welding operation, and the principal object of this invention is to provide a novel type of hammer that materially cuts down the time and effort required for properly cleaning the work before and after welding.

Other objects are to provide a hammer that will evenly distribute the force of its blow over irregularly shaped surfaces; that is light weight, easy to handle and cheap to manufacture; that in some embodiments thereof may be used effectively as a peening tool, and in other embodiments as a chipping or cleaning tool or even as an ordinary hammer; and that has a composite head made up of a plurality of relatively moveable hammer segments which may readily be pointed or refaced while mounted on the handle or may be easily removed for replacement by new segments.

It should be understood that the hammer of this invention is not limited to the uses specifically mentioned above, but also has application in other fields, as, for example, by painters in removing rust and scale from metal surfaces prior to painting, and old paint from such surfaces prior to repainting.

These and still other objects and advantages will become apparent as the disclosure proceeds and the description is read in connection with the accompanying drawings in which Fig. 1 is a side elevational view showing a preferred embodiment of my invention with a portion of the hammer segments broken to show the manner in which the segments are loosely supported by the handle;

Fig. 7 is a top view of another form of my invention;

Fig. 8 is a side elevational view of the form of of the invention shown in Fig. 7;

Fig. 9 is an end elevational view showing the diamond point face of the multiple segment hammer head of the form of invention shown in Figs. 7 and 8;

Figs. 10 and 11 are top and side elevational views of another modified form of invention, in this case with the multiple segments readily removeable from the handle for replacement or refacing;

Fig. 12 shows how the pick or chisel points of any of the forms of the invention may be used for removing scale from rivet heads; and Fig. 13 illustrates how the rear face of the hammer shown in Figs. 7 to 11 inclusive may be modified from a diamond point face to a peening face by rounding the ends of the multiple segments.

Figure 1:
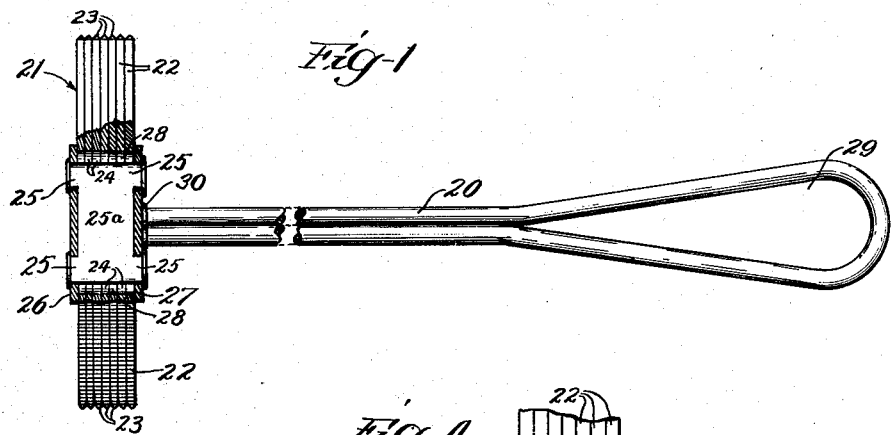
Figure 4:
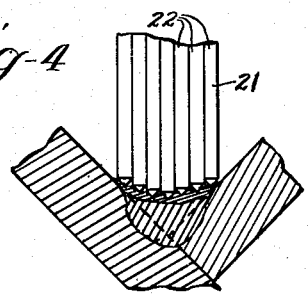
Fig. 4 illustrates how the tool may be used to remove slag from the surface of a fillet weld on an inside corner.
Figure 5:
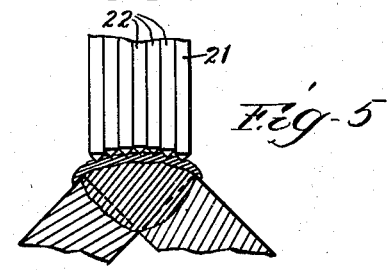
Fig. 5 illustrates the use of the tool for removing slag from an outside corner.
Figure 6:
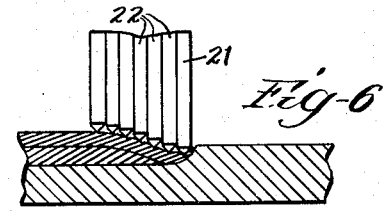
Fig. 6 illustrates the shape of the depression in the plate at the end of a weld bead and how the hammer of this invention may be effectively used to remove the slag from the surface of the bead preparatory to continuing the welding bead.

Certain preferred forms of my invention have been shown in the drawings and will hereafter be described, but it should be understood that the selection of these embodiments to illustrate the invention is for the purpose of complying with Section 4888 of the Revised Statutes, and should not be construed as limiting the appended claims except as may be required by the prior art.

The basic principle underlying my invention resides in the use of a multiple segment or laminated hammer head, the segments of which are free to move relative to each other within restricted limits. In dealing a hammer blow, it is not the force that is applied from the hand to the hammer head through the handle that is responsible for the force of the blow, but rather the momentum given to the hammer head by the swinging of the hammer prior to the blow. By using a multiple segment head in which the individual segments are relatively moveable, the face of the hammer that engages the struck part can adapt itself and will adapt itself to the contour of the part struck and evenly distribute the force of the blow over such part. When it is considered that the conventional hammer head, being of unitary construction, will ordinarily strike an irregularly shaped object throughout an area much smaller than the face of the head, it is obvious that a hammer of the type herein disclosed will have much greater effectiveness than a solid head hammer, particularly when used for such classes of work as chipping oxide or slag from welded parts, or the removing rust, old paint, etc. from both regularly and irregularly shaped objects.

Referring now to Fig. 1, the hammer comprises a handle 20, having a composite or laminated head generally designated 21, composed of a plurality of head segments or plates 22 which, in this instance, are individually provided with pick points 23 at both ends thereof. The head segments are preferably of high carbon steel, ranging from .70 to .80 in carbon content, and are heated and quenched from 1500 degrees Fahrenheit and then drawn at a temperature suitable for producing a Rockwell C hardness of from 50 to 55. The segments, of course, may be of other suitable hard metal, as, for example, mild carbon steel which is case-hardened after fabrication. It is important to have the striking portions or cutting edges of each plate relieved or beveled slightly with respect to the adjacent plate so that as the cutting edge becomes peened or upset due to repeated blows, it will not interfere with normal relative movement between the plates.

The head 21 is mounted upon the handle 20 in such a manner that the individual segments 22 have limited relative movement with respect to each other so that the pick points 23 of the individual segments may accommodate themselves to the contour of the part being struck. This is accomplished in the present embodiment of the invention by providing each segment 22 with an elongated slot 24 adapted to receive a guide plate 25a having ear or pin projections 25 which pass through suitable openings in, and are welded, peened, or otherwise secured to, retaining plates or bearing members 26 and 27 that embrace the segments and hold them in close but not too firm engagement. The plate 25a is preferably of 1030 steel and case-hardened so as to minimize wear. The length of the plate 25a is less than the length of the slots 24 in the segments 22, which allows for a lost motion between the hammer segments 22 and the handle 20, this permissible free movement being indicated by the extension of the slot 24 beyond the outer margin of the plate 25a as indicated at 28. In this respect the ends of the slots 24 constitute spaced stops, and the ends of the guide plate 25a constitute spaced shoulders which cooperate to provide the desired lost motion action. The lateral dimension of the plate 25a is, of course, slightly less than the lateral dimension of the slot 24 so that the individual head segments may move relative to the plate without binding action.

Preferably the total movement of each head segment relative to the plate 25a is on the order of ⅜ of an inch, but this dimension, may, of course, be varied to suit the conditions.

In fabricating the hammer, the handle 20, which in this case is shown as a steel rod bent back upon itself and spread apart at 29 to provide a hand grip, is welded as indicated at 30 to the lower retaining plate 27. This is preferably done after the entire head assembly has been completely fabricated with the guide plate 25a welded, peened, or otherwise suitably secured to the retaining plates 26 and 27.

It will be noted that the portion of the plate 25a between the ears or pins 25 acts as shoulders to accurately fix the spacing of the two retaining plates 26 and 27 and thereby assure proper relative spacing between the individual head segments.

It should be understood that the handle may be made in a variety of forms, as, for example, a steel tube might be employed with a rubber grip, or a steel shank used adapted to receive a wooden handle.

The hammer shown in Figs. 7, 8, and 9 differs slightly from the one just described primarily in the shape of the head segments and in the manner in which the lost motion between the handle and the head is accomplished. In the form of the invention shown in Figs. 7 to 9 inclusive, the individual segments 35 are arrow-shaped and have a pick point 36 at one end and a series of diamond points 37 extending across the width of the segment at the other end. Considering the segments together, the pointed end of the head constitutes a composite cutting edge or a chisel face generally designated 38, while the rear face constitutes a multi-diamond pointed, knurled face generally designated 39 (see Fig. 9).

In this instance, the lost motion between the handle 40 and head is accomplished by welding two U-shaped brackets 41 and 42 together over the reduced middle section 43 of the segments. These brackets are of a size which permit the individual segment heads to move relative to each other, the limit of movement being determined by the difference between the length of the reduced portion 43 of the segments and the length of the brackets themselves. This opportunity for relative movement is indicated by the spaces 44 and 45 on both sides of the welded brackets 41 and 42. The handle, as before, is welded or otherwise secured to the retaining brackets of the head as indicated at 46.

Figure 2:
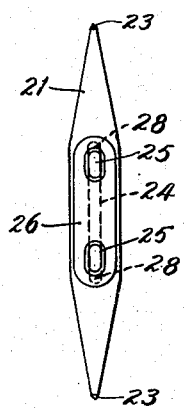
Fig. 2 is a top elevational view of the hammer shown in Fig. 1.

Still another embodiment of the invention is shown at Figs. 10 and 11, this one being characterized by the ready detachability of the head from the handle for the replacement of any head segments or their removal for repointing or refacing. In this form of the invention, the construction of the head is somewhat similar to that shown in Figs. 1 and 2 except that in this case two separate pins 47 are used instead of a unitary plate to space the retaining plates 48 and 49. The pins 47 are reduced in size to form shoulders 50 to establish the desired spacing of the retaining plates 48 and 49, and are preferably, though not necessarily welded, peened or otherwise secured to the bottom plate 48.

The pins 47 pass through slots 51 in the segments, these slots being sufficiently oversize with respect to the pins 47 to provide the desired travel of the segments relative to the handle.

The handle for the hammer in this instance, has a single shank 52 bent back upon itself to provide a hand grip and having at its upper end a reduced portion 53, which extends through one of the elongated slots 51 in the segments, and has a shoulder 54 upon which the bottom retaining plate 48 is seated and may be secured thereto by welding, and a second reduced portion indicated at 55, threaded to receive a retaining nut 56 and providing a shoulder 57 for assisting the pins 47 with their shoulder 50 in properly spacing the retaining plates 48 and 49 to provide for the desired relative movement of the head segments.

To remove the head, it is necessary only to loosen the nut 56, whereupon the top retaining plate 49 may be removed and the segments taken from the handle for replacement or refinishing.

Figure 3:
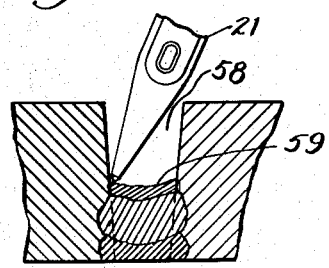
Fig. 3 is a view illustrating how the hammer of this invention aids in removing flux or slag from the surface of a multi-pass weld between two abutting plates.

The advantages of a hammer having individually moveable head segments as shown in the three forms of the invention above described are apparent by referring to Figs. 3 to 6 inclusive and Fig. 12. When it is necessary to remove slag from a multi-pass butt weld, as shown in Fig. 3, not only may the chisel point of the hammer reach down into the recess 58 between the adjacent plates, but the individual segments comprising the hammer head may adjust themselves to irregularities in the slag 59 and produce multiple blows with each stroke of the hammer, which effectively removes the slag.

Likewise, in cleaning slag from an inside fillet weld (see Fig. 4), or an outside joint (see Fig. 5), or the irregular depression at the end of an unfinished weld seam (Fig. 6), the segments accommodate themselves to the varying contours of the slag and each segment, as the blow is struck, performs its part in distributing the effect of the blow over an area commensurate with the dimension of the hammer face. Obviously, the effect of the blow is many times that of a conventional chip hammer of unitary head construction.

Fig. 12 illustrates the manner in which the hammer may be used effectively in chipping around a rivet, as, for example, when old paint, rust, etc., is to be removed for one purpose or another.

On relatively flat areas, the broad knurled face 39 is particularly effective and this face may be modified as shown in Fig. 13 to provide a plurality of peening edges 60 for the individual head segments.

When the hammer is used for removing slag from welds, it does not matter a great deal whether the pick points of the chisel face 38 or the diamond points of the knurled face 39 become dull because the peening action of the dulled points is advantageous in causing the metal of the weld to flow and to remove welding stresses. However when it is desirable to sharpen the pick points of the segments, this may readily be done while the segments are still mounted on the handle by advancing first one and then another of the segments against a grinding stone. In the case of the hammer shown in Figs. 10 and 11, the segments may readily be removed for repointing or refacing.

In any case where the object of a hammer blow is to chip metal or cause metal to flow as distinguished from striking an object such as a nail to drive it into another member, a hammer of the type herein described is particularly effective, and it should be understood that the individual segments will vary to suit the particular use for which the hammer is designed. The same is true with respect to the extent of the relative movement permitted by the head segments and the handle.

In some cases, it may be desirable to provide suitable spacers between the head segments to facilitate their relative movement, but ordinarily the force of the blows struck will operate to keep the interfaces of the segments free of rust or other foreign material that might cause them to bind.

I claim:

1. A hammer comprising a handle, a laminated head and means mounting said head on said handle, said head including a plurality of elongated plates stacked face to face, one end of each plate having its side edges converging to form a cutting edge, the cutting edges of the stacked plates being in alignment to form a composite cutting edge, the portions of each cutting edge lying next to an adjacent plate being relieved, said mounting means mounting said plates for limited individual lengthwise movement in a direction transversely of said handle with the composite cutting edge in a plane parallel to said handle and including an elongated flat bearing member extending lengthwise of said plates and engaging the exposed flat surface of the plate at the end of the stack, a similar flat bearing member engaging the exposed flat surface of the plate at the other end of the stack, said bearing members being of sufficient width to prevent out-of-plane movement of said plates, guiding means extending at right angles to the flat surfaces of the plates providing at least bearing surfaces spaced a substantial distance lengthwise of said plates, each engaging lengthwise bearing surfaces on each of said plates to prevent sidewise movement of said plates, spaced stops on said plates and spaced shoulders on said guiding means cooperating to limit the aforesaid lengthwise sliding movement of said plates, and means securing said bearing members and guiding means to said handle.

2. The hammer as set forth in claim 1 in which the stacked plates are provided with elongated aligned slots through which the guiding means extends to provide the cooperating shoulders and stops for limiting the lengthwise sliding movement of said plates.

3. The hammer as set forth in claim 2 in which the slots are cut along the longitudinal center line of said plates.

4. The hammer as set forth in claim 2 in which the slots are cut along the longitudinal center line of said plates and the guiding means consists of an elongated guide plate, the end walls of which constitute said spaced shoulders.

5. The hammer as set forth in claim 1 in which a single elongated slot is cut through each plate along the center line thereof and the guiding means consists of an elongated flat guide plate mounted within the slots and of smaller longitudinal dimension than the slots, said guide plate having ear portions extending into slots in said bearing members for holding said bearing members in proper alignment with respect to the stacked plates, said guide plate also having portions against which the inner faces of said bearing members abut to maintain said bearing members in predetermined spaced relationship thereby to prevent binding of said stacked plates.

6. The hammer as set forth in claim 1 in which a strap encircles the stacked plates and constitutes the guiding means, and in which the spaced stops on the stacked plates are along the marginal edges of said stacked plates.

7. The hammer as set forth in claim 1 in which the guiding means consists of spaced pins each extending through elongated aligned slots in the stacked plates.

8. The hammer as set forth in claim 1 in which the laminated head is detachably secured to the handle by a nut threaded onto an extension of said handle.

ARTHUR A. BERNARD.

REFERENCES CITED

The following references are of record in the file of this patent:

UNITED STATES PATENTS

| Number | Name | Date |
|---|---|---|
| 2,175,537 | Montague | Oct. 10, 1939 |
| 2,335,150 | Johnson | Nov. 23, 1943 |